(12) United States Patent
Lu et al.

(10) Patent No.: US 10,367,596 B1
(45) Date of Patent: Jul. 30, 2019

(54) MULTIPLE WAVELENGTH SELECTIVE SWITCH WITH SHARED SWITCH

(71) Applicant: Coadna Photonics Inc., Sunnyvale, CA (US)

(72) Inventors: Oliver Lu, Sunnyvale, CA (US); Helen Chen, Sunnyvale, CA (US); Gordon Jiang, Sunnyvale, CA (US); Simon He, Sunnyvale, CA (US); Lawrence Wang, Sunnyvale, CA (US); Tom Li, Sunnyvale, CA (US); Jim Yuan, Sunnyvale, CA (US); Jack Kelly, Sunnyvale, CA (US); Fenghua Li, Sunnyvale, CA (US)

(73) Assignee: II-VI Delaware, Inc., Wilmington, DE (US)

(*) Notice: Subject to any disclaimer, the term of this patent is extended or adjusted under 35 U.S.C. 154(b) by 0 days.

(21) Appl. No.: 15/986,586

(22) Filed: May 22, 2018

Related U.S. Application Data

(60) Provisional application No. 62/510,164, filed on May 23, 2017.

(51) Int. Cl.
  *H04J 14/02* (2006.01)
  *H04Q 11/00* (2006.01)
(52) U.S. Cl.
  CPC ...... *H04J 14/0212* (2013.01); *H04Q 11/0005* (2013.01); *H04Q 2011/0015* (2013.01);
  (Continued)
(58) Field of Classification Search
  CPC ............. H04J 14/0212; H04Q 11/0005; H04Q 2011/0015; H04Q 2011/0016; H04Q 2011/0035
  (Continued)

(56) References Cited

U.S. PATENT DOCUMENTS 4,822,150 A * 4/1989 Duarte ..................... G02B 5/04
  359/485.06
5,917,625 A * 6/1999 Ogusu .................. G02B 6/2931
  385/132
(Continued)

OTHER PUBLICATIONS

Wall et al, WSS Switching Engine Technologies, Feb. 2008, OFC/NFOEC, All Document.*

*Primary Examiner* — Kenneth N Vanderpuye
*Assistant Examiner* — Dibson J Sanchez
(74) *Attorney, Agent, or Firm* — Wendy W. Koba

(57) ABSTRACT

A multiple wavelength selective switch has an optics assembly to receive a first input optical signal from a first ingress port and a second input optical signal from a second ingress port. A switch assembly has a single switching mechanism to direct the first input optical signal to the optics assembly as a first output optical signal and the second input optical signal to the optics assembly as a second output optical signal. The switch assembly directs the first output optical signal to a first egress port selected from the first set of egress ports and directs the second output optical signal to a second egress port selected from the second set egress ports. The first egress port and the second egress port have the same wavelength channel. The multiple wavelength selective switch supports an arbitrary number of wavelength channels that can be switched at the same time. Each switch assembly directs signals from a set of ingress ports to a set of egress ports sharing the same wavelength channel.

17 Claims, 16 Drawing Sheets

(52) U.S. Cl.
    CPC ............... *H04Q 2011/0016* (2013.01); *H04Q 2011/0035* (2013.01)

(58) Field of Classification Search
    USPC .................................................. 398/43–103
    See application file for complete search history.

(56) References Cited

U.S. PATENT DOCUMENTS

| | | | |
|---|---|---|---|
| 6,285,500 B1 | 9/2001 | Ranalli et al. | |
| 6,337,935 B1 * | 1/2002 | Ford | G02B 6/2931 385/15 |
| 6,600,582 B1 * | 7/2003 | Liu | G02B 6/272 398/48 |
| 6,760,501 B2 * | 7/2004 | Iyer | G02B 6/2931 385/16 |
| 7,092,599 B2 | 8/2006 | Frisken | |
| 7,116,480 B1 * | 10/2006 | Li | G02B 27/283 359/484.06 |
| 7,231,110 B2 * | 6/2007 | Yamamoto | G02B 6/2713 385/11 |
| 7,292,786 B1 * | 11/2007 | Barbarossa | G02B 6/29302 398/82 |
| 7,305,188 B2 * | 12/2007 | Yamashita | H04J 14/0212 398/79 |
| 7,873,246 B2 * | 1/2011 | Nagy | G02B 6/29311 385/18 |
| 8,797,638 B2 | 8/2014 | Hotta | |
| 9,019,612 B2 | 4/2015 | Wagener | |
| 9,201,286 B2 | 12/2015 | Mao et al. | |
| 9,288,559 B2 | 3/2016 | Frisken et al. | |
| 9,304,257 B2 | 4/2016 | Keyworth et al. | |
| 9,354,365 B2 * | 5/2016 | McLaughlin | G01J 3/02 |
| 9,363,582 B2 | 6/2016 | Chu et al. | |
| 9,369,783 B2 | 6/2016 | Neilson et al. | |
| 9,883,263 B2 | 1/2018 | Colbourne | |
| 9,913,008 B1 | 3/2018 | Keyworth et al. | |
| 2002/0122251 A1 * | 9/2002 | DeBoynton | G02B 6/356 359/484.06 |
| 2003/0174936 A1 * | 9/2003 | Helbing | G02B 6/12007 385/24 |
| 2004/0252938 A1 * | 12/2004 | Ducellier | G02B 6/12011 385/27 |
| 2005/0036202 A1 * | 2/2005 | Cohen | G02B 6/272 359/484.05 |
| 2005/0247958 A1 * | 11/2005 | Wang | G02B 5/3016 257/200 |
| 2005/0276537 A1 * | 12/2005 | Frisken | G02B 6/2713 385/24 |
| 2007/0242953 A1 * | 10/2007 | Keyworth | G02B 6/12007 398/48 |
| 2008/0031627 A1 * | 2/2008 | Smith | G02B 6/2931 398/83 |
| 2009/0028502 A1 * | 1/2009 | Presley | G02B 6/29385 385/18 |
| 2009/0103861 A1 * | 4/2009 | Presley | G02B 6/3548 385/16 |
| 2010/0061727 A1 * | 3/2010 | Colbourne | H04J 14/0206 398/48 |
| 2011/0234951 A1 * | 9/2011 | Cohen | G02B 6/2713 349/113 |
| 2012/0236216 A1 * | 9/2012 | Sharma | G02B 26/02 359/223.1 |
| 2013/0279910 A1 * | 10/2013 | Ziari | H04J 14/06 398/65 |
| 2015/0124187 A1 * | 5/2015 | Xie | G02F 1/31 349/41 |
| 2015/0208143 A1 * | 7/2015 | Frisken | G02B 6/3512 398/48 |
| 2015/0212275 A1 * | 7/2015 | Mao | G02B 6/29311 385/11 |
| 2016/0165324 A1 * | 6/2016 | Zhao | H04J 14/02 398/48 |
| 2018/0059431 A1 * | 3/2018 | Yang | G02B 27/4244 |

\* cited by examiner

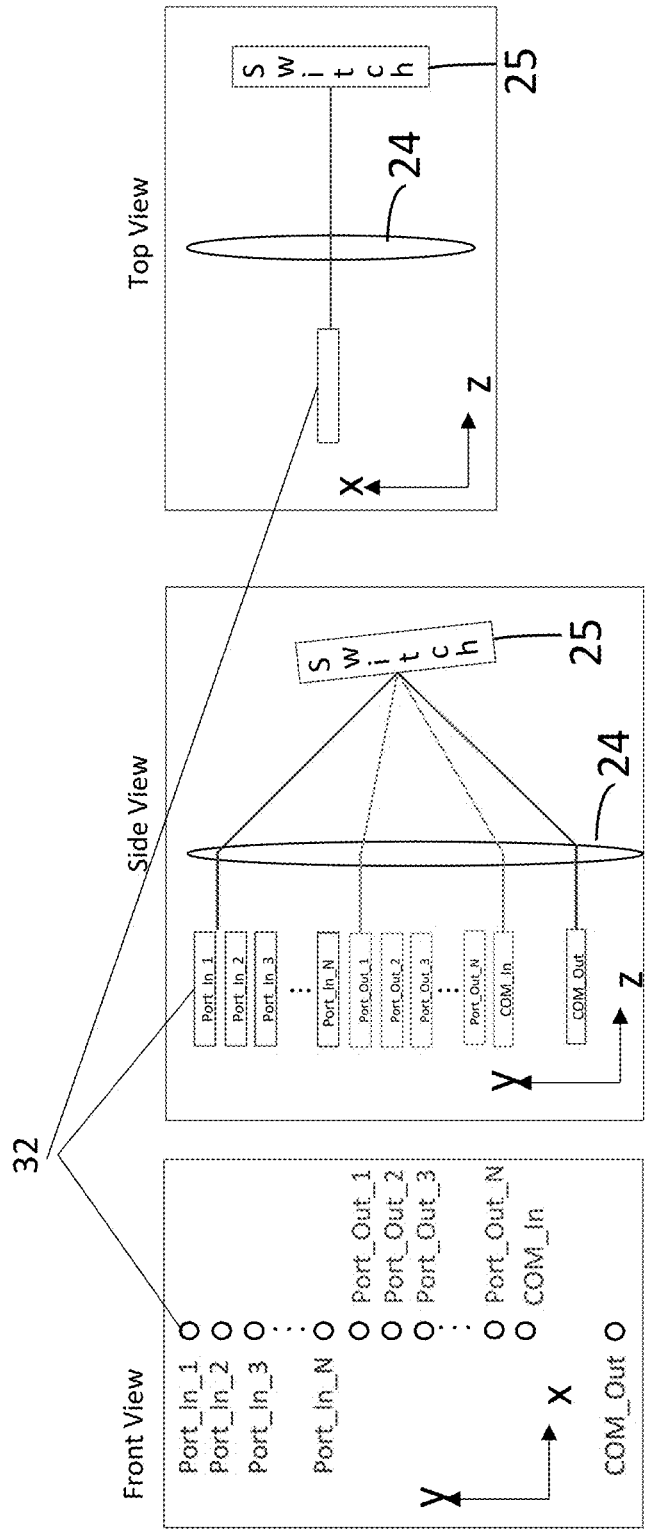

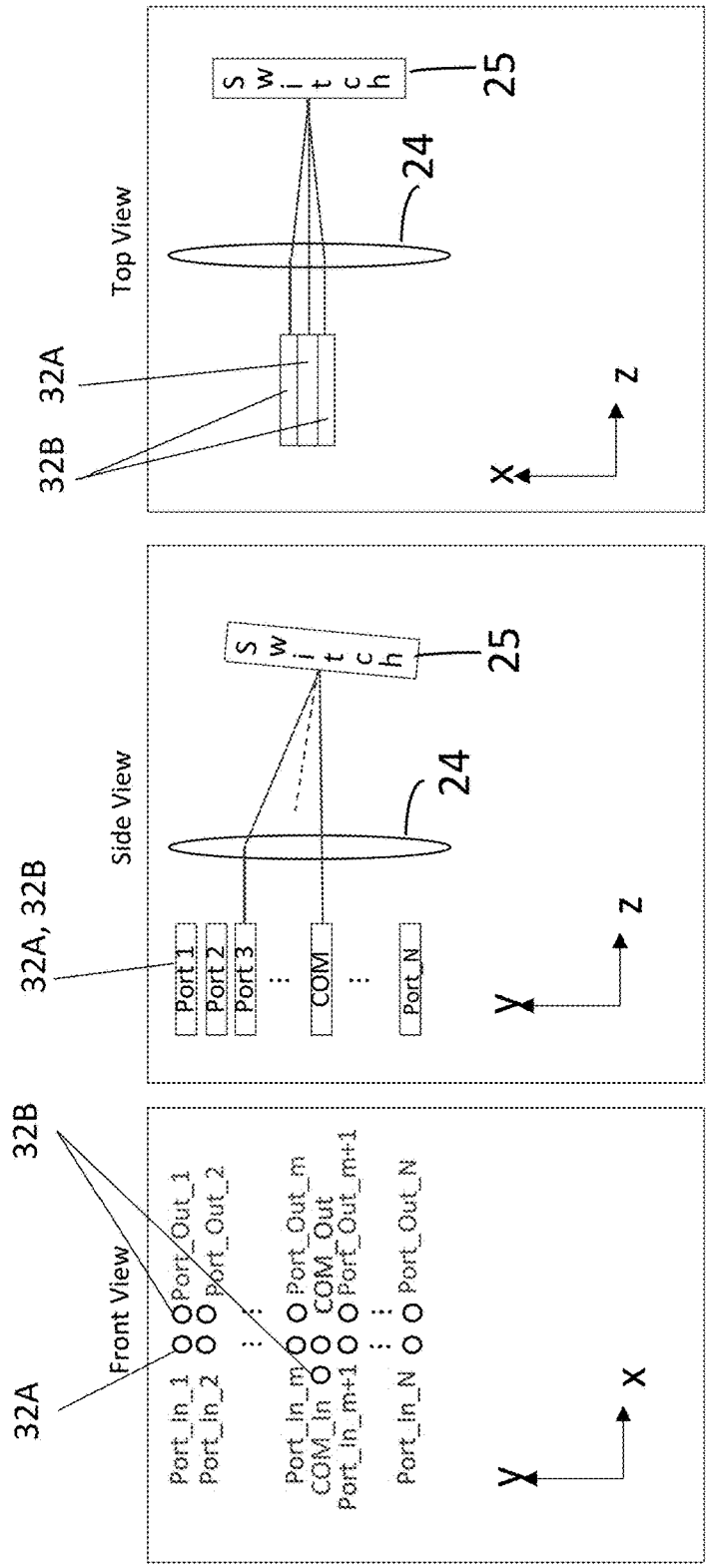

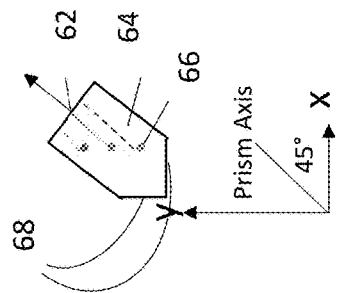
FIG. 6D
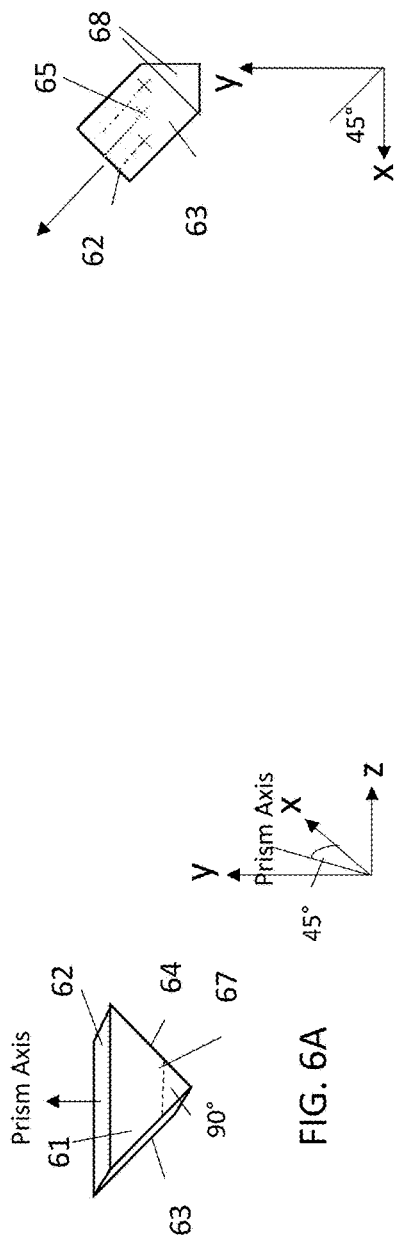
FIG. 6C
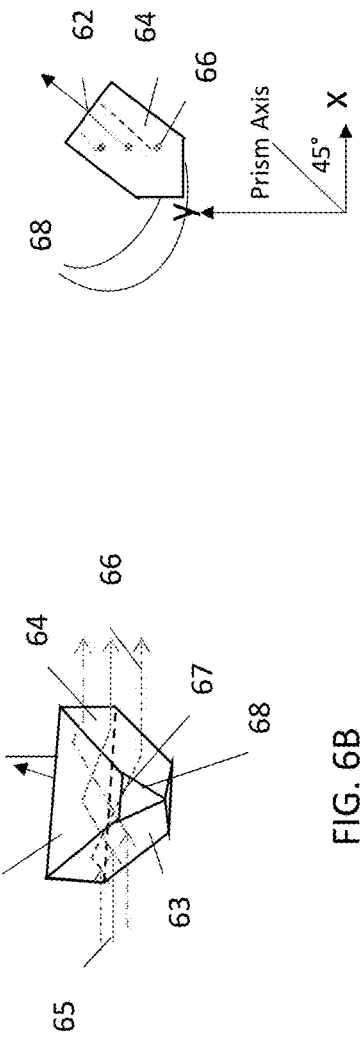
FIG. 6B
FIG. 6A

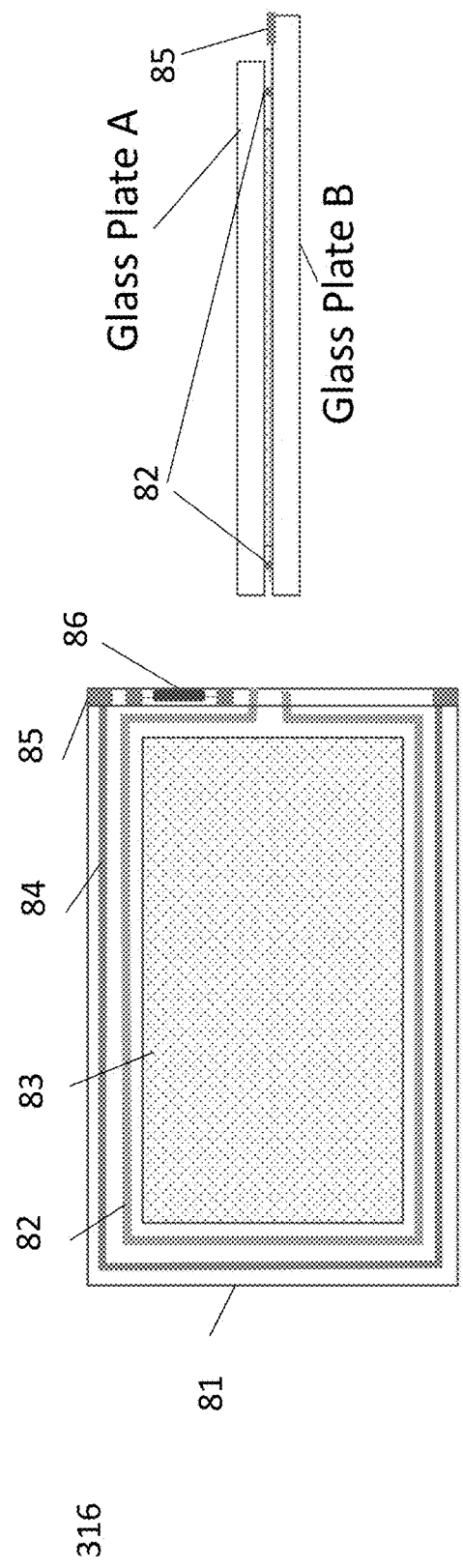

MULTIPLE WAVELENGTH SELECTIVE SWITCH WITH SHARED SWITCH

CROSS-REFERENCE TO RELATED APPLICATION

This application claims priority to U.S. Provisional Patent Application Ser. No. 62/510,164, filed May 23, 2017, the contents of which are incorporated herein by reference.

FIELD OF THE INVENTION

The present invention relates generally to optical switching devices. More particularly, the invention is directed toward wavelength selective switches.

BACKGROUND OF THE INVENTION

With the development of the fifth generation wireless network to meet the demanding needs generated by artificial intelligence, augmented reality, virtual reality, autonomous driving, etc., reconfigurable optical add drop multiplexers are poised to penetrate into the edge access ring network, which was traditionally dominated by fixed optical add drop multiplexers. The key requirement for this emerging market is low cost.

A typical edge access ring network has less than ten nodes and two fiber rings handling east and west traffic. Wavelength selective switches are needed at each node for wavelength cross connect and add/drop, all controlled by software. FIG. 1A shows a possible configuration of such a system, wherein a pair of wavelength selective switches 10, 11 are used for a 2D reconfigurable optical add drop multiplexer node. For an M degree node (m-D node), m pairs of wavelength selective switches are used.

FIG. 1B shows the functionalities of a Reconfigurable Optical Add/Drop Multiplexer (ROADM) used in an optical node, which includes two separate wavelength selective switches 10 and 11, with one module for dropping different wavelength channels from COM_In port to different Drop ports and the Express_Out port, and one module for adding different channels from different Add ports and Express_In Port to the COM_Out port. Each module has its own switch engine to configure the channels to drop at drop ports 12A to 12N, and at add ports 13A to 13N. The Add module 10 and the Drop module 11 are often combined into a Twin module 14. The add or drop signal is processed by its own switch engine. This proliferation of switches adds cost and complexity to wavelength selective switches.

SUMMARY OF THE INVENTION

A multiple wavelength selective switch has an optics assembly to receive a first input optical signal from a first ingress port and a second input optical signal from a second ingress port. A switch assembly has a single switching mechanism to direct the first input optical signal to the optics assembly as a first output optical signal and the second input optical signal to the optics assembly as a second output optical signal. The switch assembly directs the first output optical signal to a first egress port selected from the first set of egress ports and directs the second output optical signal to a second egress port selected from the second set egress ports. The first egress port and the second egress port have the same wavelength channel. The multiple wavelength selective switch supports an arbitrary number of wavelength channels that can be switched at the same time. Each switch assembly directs signals from a set of ingress ports to a set of egress ports sharing the same wavelength channel.

BRIEF DESCRIPTION OF THE FIGURES

The invention is more fully appreciated in connection with the following detailed description taken in conjunction with the accompanying drawings, in which:

FIGS. 4A-4K illustrate various port arrangements of the shared switch WSS.

FIGS. 6A-6D illustrate a beam rotator to convert vertically aligned ports into horizontally aligned ports to reduce module height.

FIGS. 8A-8B illustrate a local heating element on glass plate to keep the shared switch WSS at an elevated constant temperature.

Like reference numerals refer to corresponding parts throughout the several views of the drawings.

DETAILED DESCRIPTION OF THE INVENTION

Figure 1A:
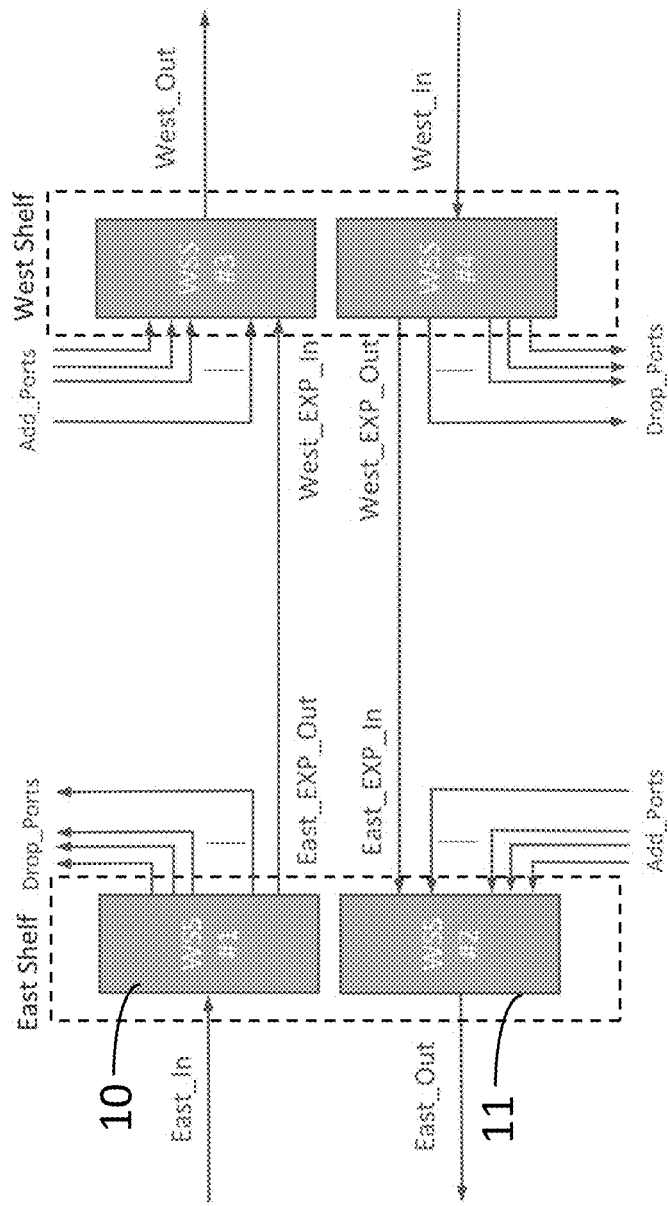
FIG. 1A is schematic of a Wavelength Selective Switch (WSS) used in a Reconfigurable Optical Add Drop Multiplexer (ROADM) ring for backup with East-West separation.
Figure 1B:
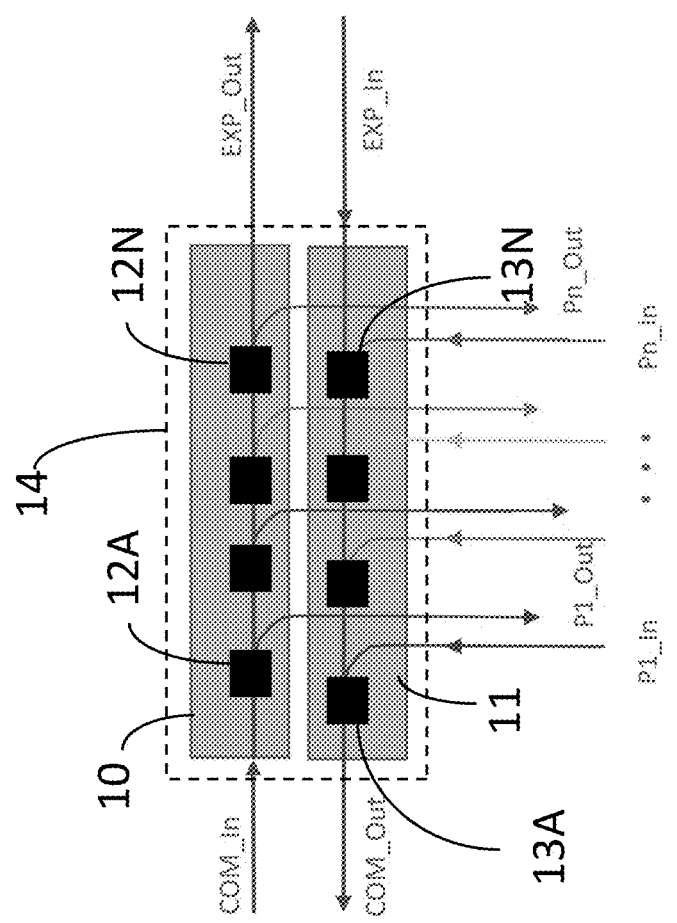
FIG. 1B illustrates a ROADM module with a twin WSS with individual switches for each switched signal.
Figure 2A:
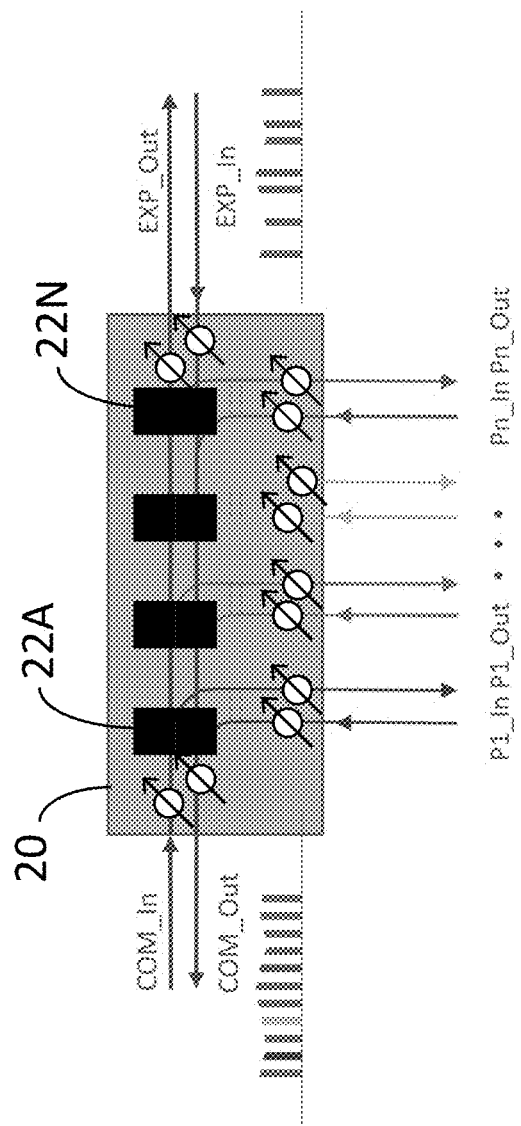
FIG. 2A illustrates a shared switch twin WSS configured in accordance with an embodiment of the invention.

FIG. 2A shows the functionality of a shared switch WSS 20 for use in a Reconfigurable Optical Add Drop Multiplexer (ROADM) node. A single switch is used for a pair of switched ports. The single switch or shared switch results in wavelength configurations 22A through 22N in FIG. 2A. The invention effectively combines WSS #1 10 and WSS #2 11 (or WSS #3 and WSS #4) in FIG. 1 into one module with only one switch engine in it forming a shared switch WSS that significantly reduces the cost and size of the WSS. More pairs of WSSs can be combined in the same way forming a Shared-Switch-Quadruple (SSQ)WSS, or a Shared-Switch-Multiple (SSM)WSS, which can be used for a 4D node or an m-D node to reduce the amount of WSS modules from 8 pairs, or 2 m pairs to 2 pairs which still allows east-west separation for network protection and backup redundancy requirement. This significantly reduces equipment cost, spaces and power consumption.

Figure 2B:
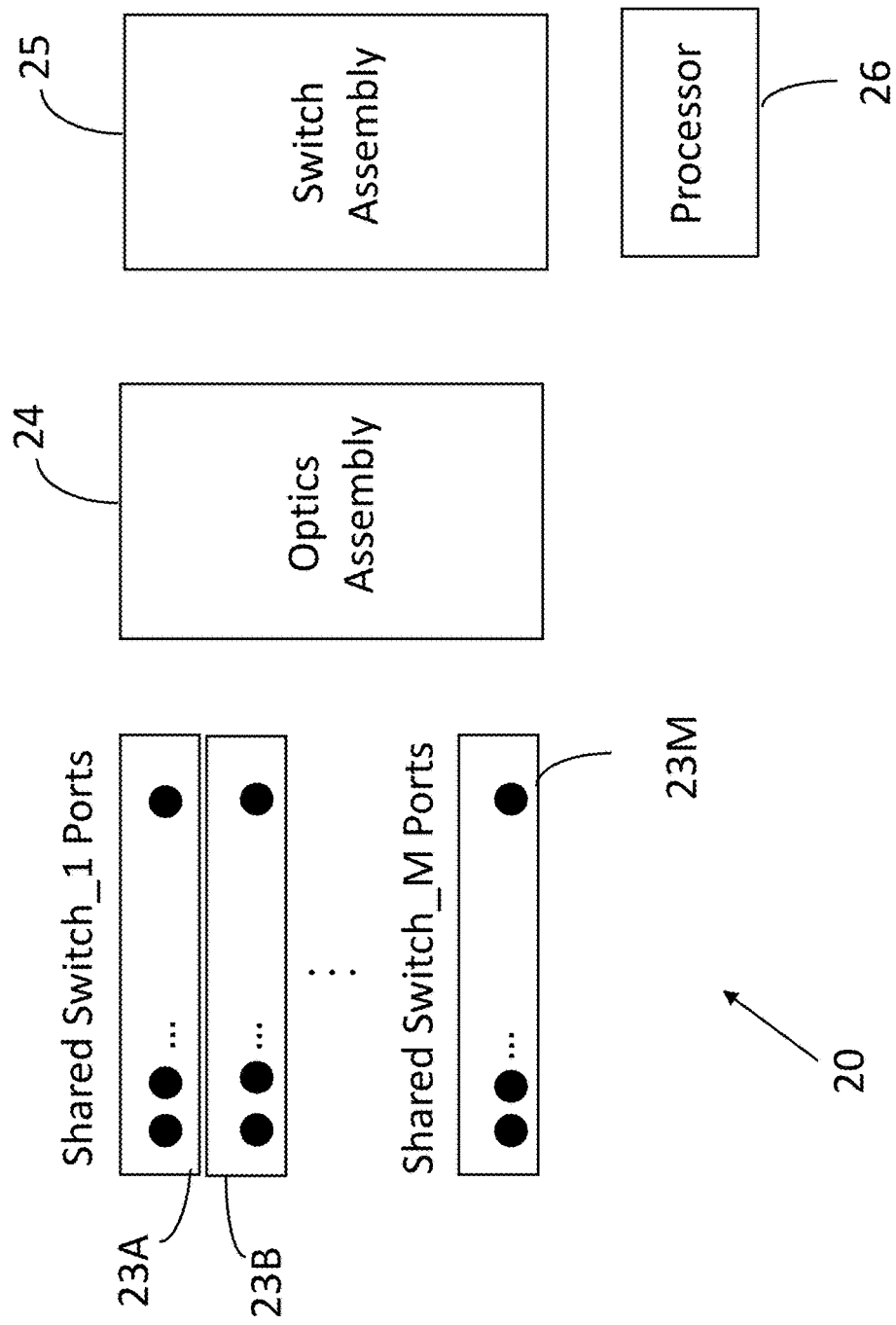
FIG. 2B illustrates major components associated with the disclosed shared switch WSS.

FIG. 2B illustrates major components associated with shared switch WSS 20. There is a collection of shared switch ports 23A through 23M. Each shared switch port 23 has an ingress port and a plurality of drop ports or a plurality of add ports and an egress port. The shared switch ports 23 have an optics assembly 24 and a switch assembly 25 controlled by a processor 26. The switch assembly 25 has a single switch for each wavelength channel to simultaneously switch signals for M sets of shared switch ports 23A to 23M. For simplicity, subsequent figures show two set of shared switch ports, such as 23A and 23B, as elements 31 and 32.

Figure 3A:
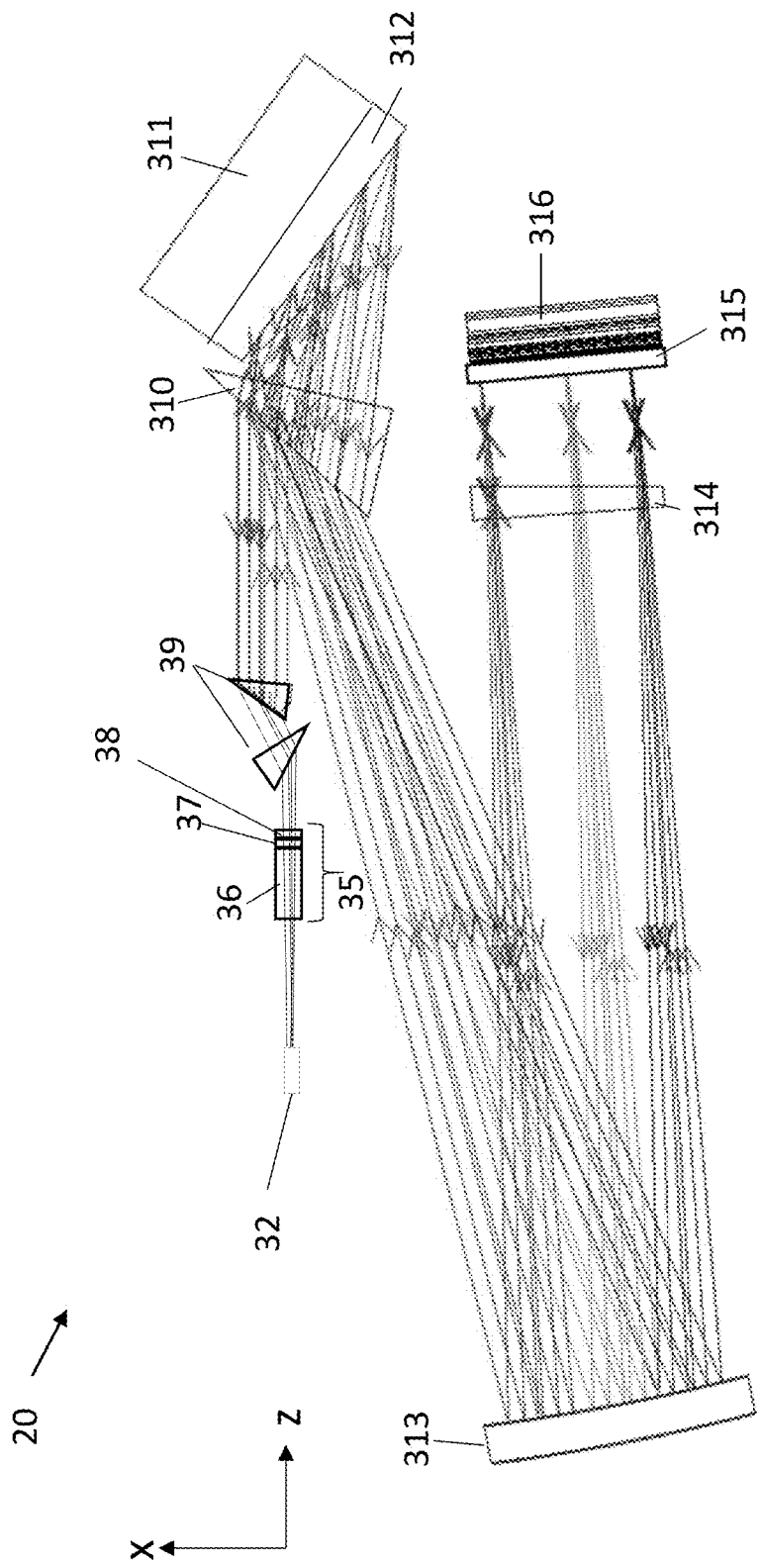
FIG. 3A illustrates a shared switch WSS base configuration associated with an embodiment of the invention.

FIG. 3A illustrates a base configuration for a shared switch twin WSS 20. In this example, there are multiple ports vertically aligned along the Y-axis, as represented by 32. The input beams go through a polarization diversity element 35, which may include a polarization beam splitter 36, for example, using a birefringent crystal, and a polarization rotator 37, such as a liquid crystal wave plate array. Finally, the polarization diversity element 35 optionally includes a variable optical attenuator 38, such as a liquid crystal variable optical attenuator array to control the each optical signal power.

The shared switch WSS 20 optionally includes beam expansion prisms 39 and a dispersion prism 310. A grating mounting block 311 supports a dispersion grating 312, which disperses and directs light to a focusing element 313, such as a curved focusing mirror. Optionally, a beam tilt correction prism 314 is used.

Optionally, a Thermal Compensation Liquid-Crystal Lens (TCLL) 315 is used with a switch assembly 316, such as a liquid crystal switch assembly, or a MEMs-based switch assembly or a Liquid Crystal on Silicon (LCoS) based switch assembly. Thus, components 36-314 correspond to optics assembly 24 of FIG. 2B. Components 315 and 316 correspond to switch assembly 25 of FIG. 2B.

Figure 3B:
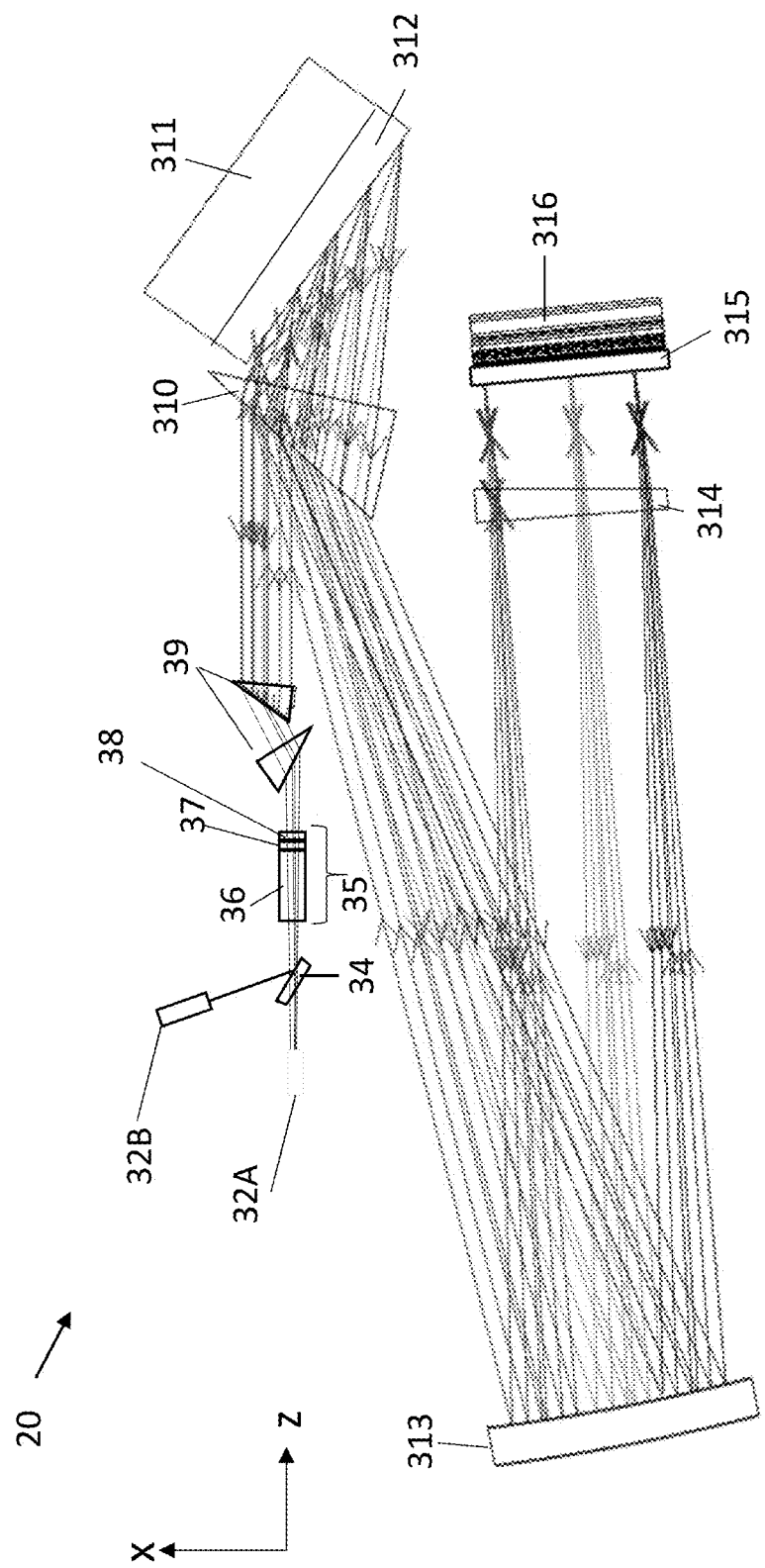
FIG. 3B illustrates a shared switch WSS base configuration with a beam combiner in accordance with an embodiment of the invention.

FIG. 3B corresponds to FIG. 3A, but includes two vertically aligned ports 32A and 32B in two locations. Beams from 32A and 32B are in two propagation directions and are then combined into one propagation direction Z by beam combiner 34.

Figure 3C:
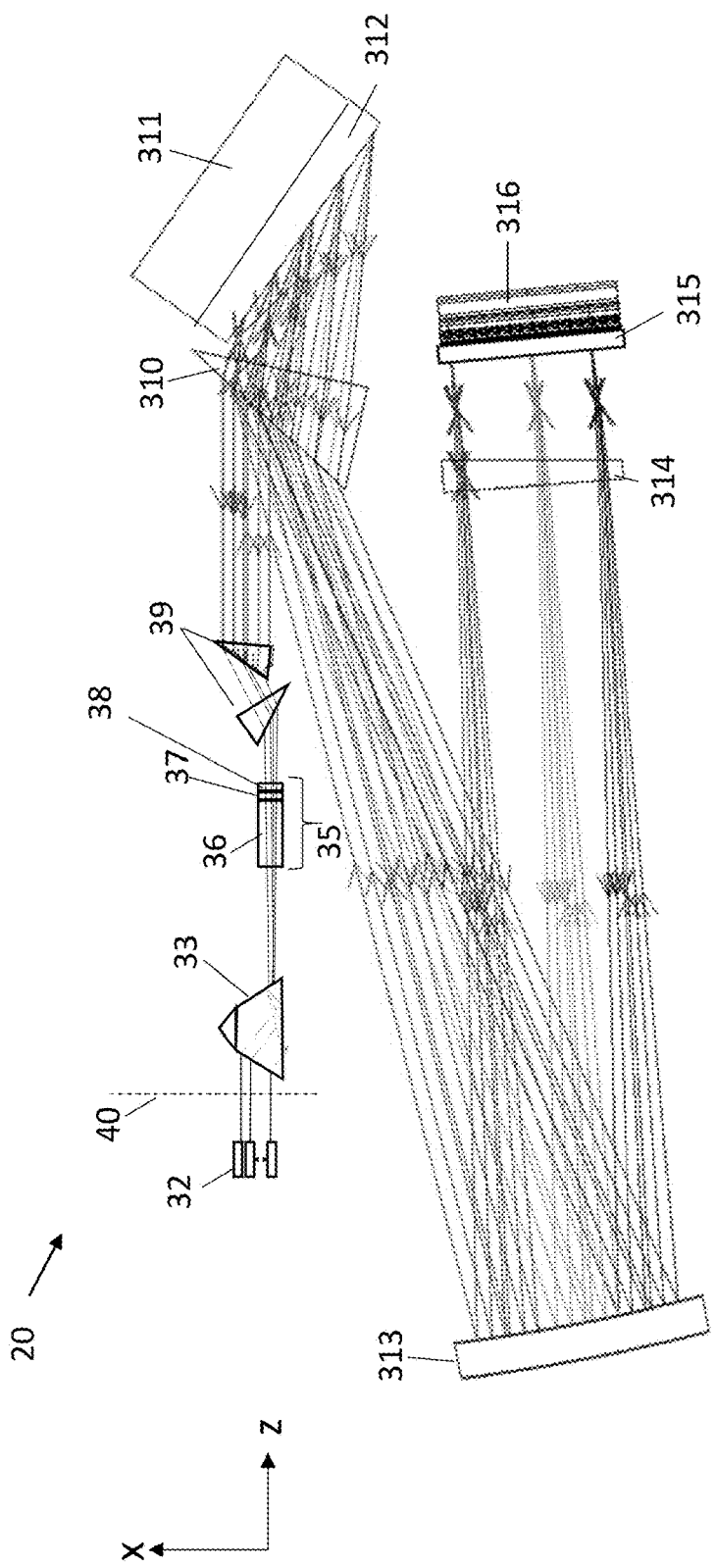
FIG. 3C illustrates a shared switch WSS base configuration with a beam rotator in accordance with an embodiment of the invention.
Figure 3D:
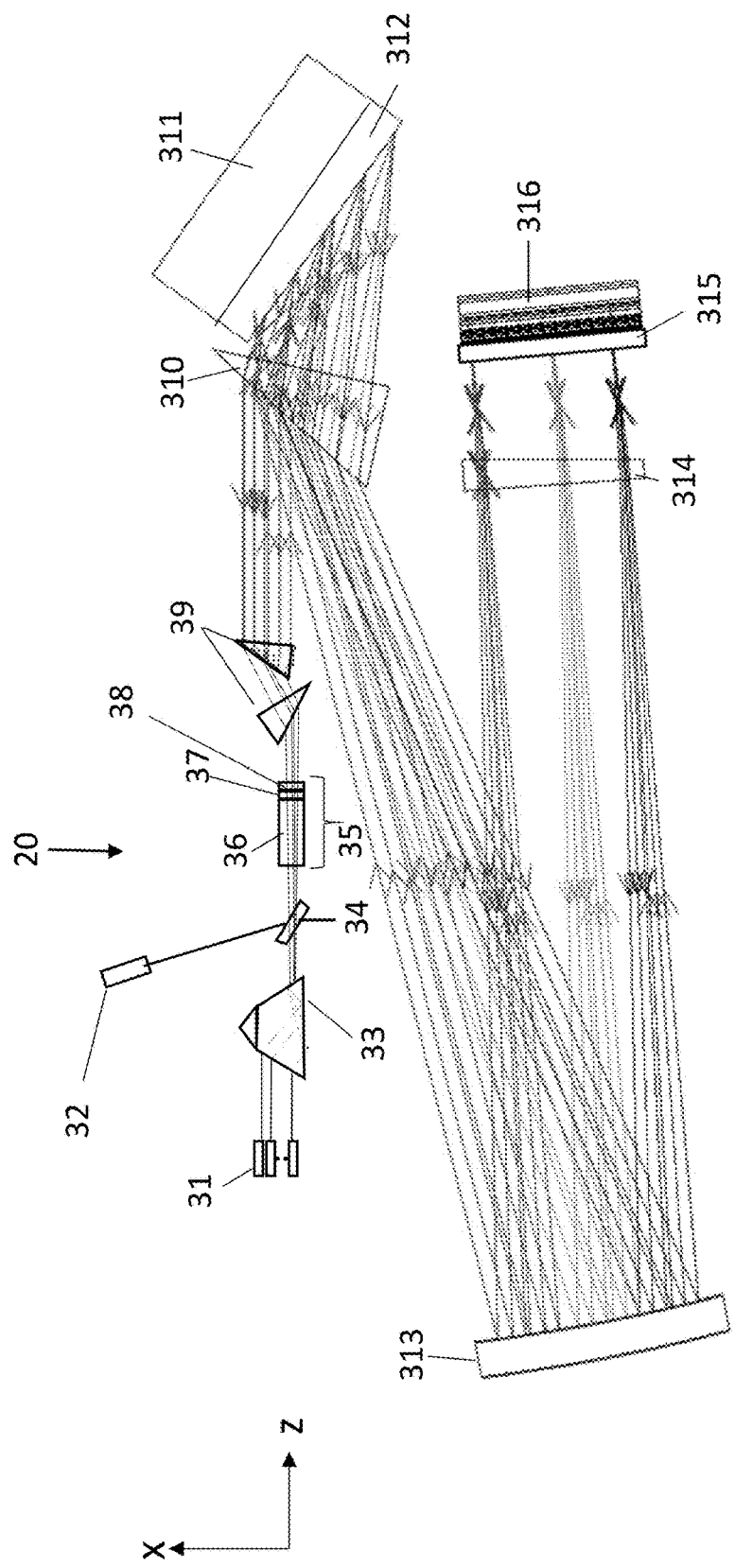
FIG. 3D illustrates a shared switch WSS base configuration with a beam rotator and beam combiner in accordance with an embodiment of the invention.

FIG. 3C corresponds to FIG. 3A, but includes horizontally aligned ports 31 along the X-axis with the input light being processed by a beam rotator 33 to rotate the input light in an orthogonal direction (i.e. vertically on the Y-axis). FIG. 3D corresponds to FIG. 3A, but includes both a beam rotator 33 and a beam combiner 34.

Returning to FIG. 2A, the shared switch twin WSS 20 has two common ports (COM_In and COM_Out), two express ports (EXP_In and EXP_Out), and N pairs of interlocked add/drop ports. Flexible numbers of wavelengths (either single wavelength or multiple wavelengths) can be switched to add and drop ports. However, each pair of add port and drop port is switched simultaneously with the same wavelength channel. All ports can have built-in individual VOA controls for power equalization.

Returning to FIGS. 3A-3D, the direction of beam propagation is the Z-axis, the horizontal direction is the X-axis and vertical direction is the Y-axis. The beam combiner 34 combines beams from two directions into one direction Z. There are numerous advantages associated with this configuration. First, it can bring the beams from ports that have large outer diameters into one or two arrays of beams with much smaller separation between the ports and between the arrays thus overcoming the port space limitation set by the physical size of the optical ports. Second, the combiner, in one embodiment, is a matrix arrangement of micro mirrors coated on a glass plate, which allows a beam reflection with a large range of angles thus facilitating a more effective utilization of the module space.

The beam rotator 33 is also an element for better module space utilization. Stringent height requirements are demanded for WSS modules by ROADM network system companies. Vertically aligned ports become the physical limiter of the module height. Using a beam rotator can rotate an array of vertically aligned ports into an array of horizontally aligned ports. A more detailed description of this element is discussed in connection with FIGS. 6A-6D.

After the beams are combined with a beam combiner, they go through the dispersion diversity element 35 to become linearly polarized. In one embodiment, a Liquid Crystal (LC) based wave plate (WP) array 37 with a birefringent crystal 36 is used. The details for this element are discussed in connection with FIGS. 5A-5C. The polarized beams then go through an LC-based variable optical attenuation (VOA) array 38 for extra control of the output power on each port. This is an optional element, depending on the need of the network.

A pair of beam expansion prisms 39 is used to expand the beam horizontally so that the horizontal focal spot on the LC switch, focused by the focusing mirror 313, can be minimized to provide better spectral bandwidth and resolution. In principle, a horizontal cylindrical lens can also be used to expand the beam horizontally, but the prism pair has the advantage of being insensitive to the position, thus providing much better manufacturing tolerance. Note that the focusing element 313 can also be a spherical lens with a reflecting mirror as the back surface.

The beams then go through a dispersion right angle prism 310 twice, before and after the grating, providing a large spectral dispersion along x direction, such that each wavelength will be focused on the LC switch element 316 at different position. The LC switch element 316 can be a LC-based switch or a micro electrical mechanical system (MEMs)-based switch, or a Liquid Crystal on Silicon (LCoS) based- switch, which provide beam steering along the Y-axis, thus switching the returned beams to the designated ports. The prism 314 corrects the tilting of the focal plane introduced by the curved mirror. Element 315 is placed in front of the switch element 316 for correcting the thermal lensing effect. The details of this element are discussed in connection with FIGS. 7A-7B. This LC-based lens, if horizontally rotated, can also be placed at front end location near the variable optical attenuator 38 to provide wavelength tuning.

FIG. 4a illustrates a single-column of optical ports for a shared switch WSS. These ports may be resident within a housing that has pigtail optical links that extend to the exterior of the housing. Each pigtail optical link has a port designation corresponding to one of the port designations shown in FIG. 4A. FIG. 4B is a side view to illustrate a switching operation, while FIG. 4C is a top view. The imaging optics 24 are simplified as a lens and switching optics 25 are simplified as a mirror which can tilt at various vertical angles.

In ports (Port_In_1 through Port_In_N) and COM-Out are associated with what would traditionally be ports for a first switch, while Out Ports (Port_Out_1 through Port_Out_N) and COM_In are associated with what would traditionally be ports for a second switch. As previously indicated, a single shared switch is used, instead of the prior art approach of separate switches.

In the example of FIG. 4B, COM_In is switched to Port_Out_1 for a drop wavelength channel. COM_Out is automatically switched to Port_In_1 for the added wavelength channel. The limitation for the shared switch having a tied channel selection to the drop port and add port may be a problem for ROADM systems in long-haul and metropolitan applications where multiple connection dimensions are involved. For an edge access ring network, however, there are only two directions of east and west and it is quite natural to drop a wavelength and then add the same wavelength to fully utilize the spectrum in the ring. Application of the current invention is not limited to edge access ring networks. It can also be used in any system that dropping and adding of the same wavelength can be managed.

Figures 4D, 4E:
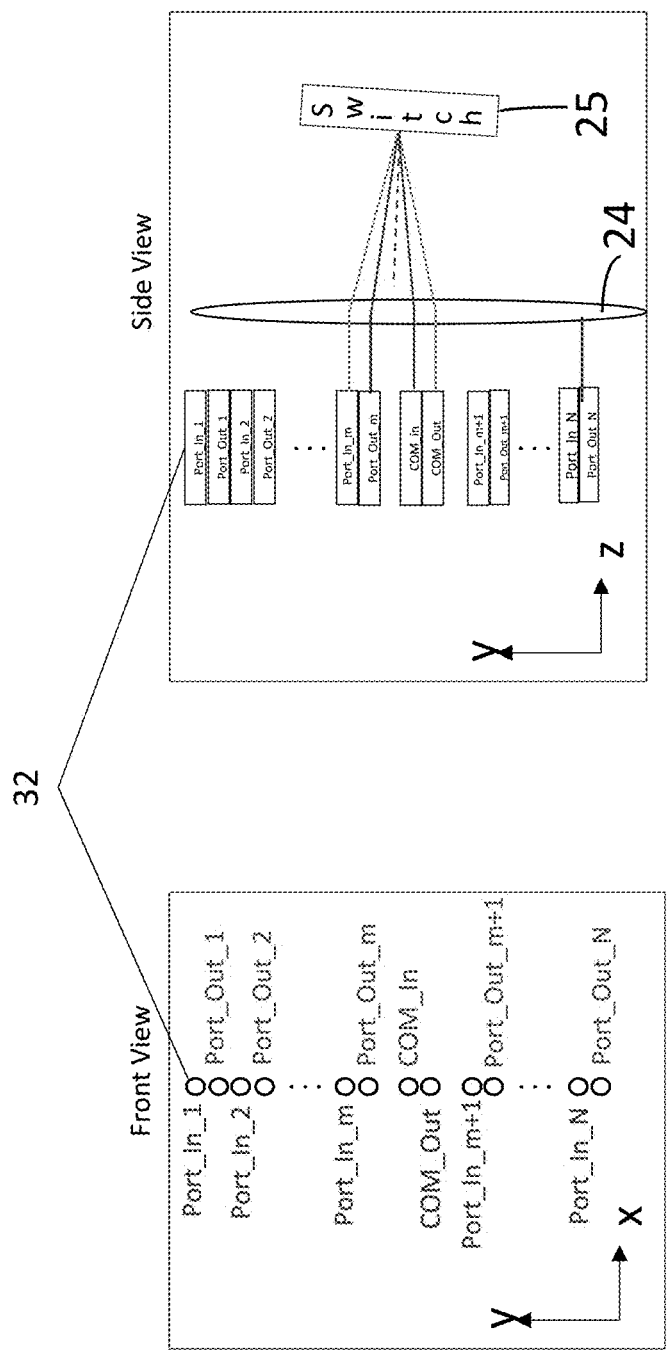

Single column arrangements can have different variations depending on the network requirement on the port performance. FIGS. 4D-4E illustrate another practical arrangement of the ports to realize shared switch twin WSS functionalities, where the add ports and the drop ports are interleaved with each other with the COM_In and COM_Out ports separated from the rest of the ports with 1 port spacing. The top view of this arrangement is the same as shown in FIG. 4C.

Figures 4F, 4G, 4H:
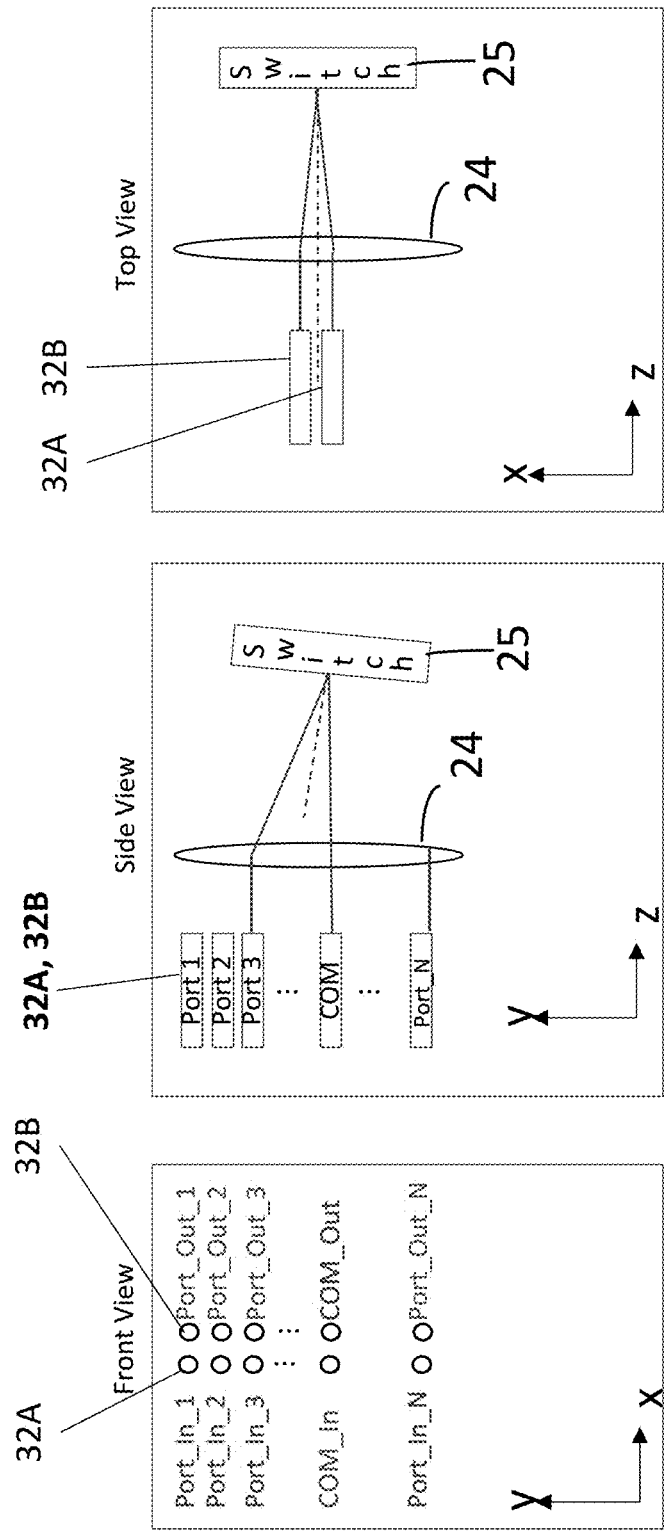

FIGS. 4F-4H are the front view, side view and top view illustrations of an embodiment of 2-column ports arrangement with the COM_In port of one WSS in the same array as ports of the second WSS. The COM port can also be arranged as shown in FIGS. 4I-4K. The advantage of this arrangement is that one WSS (the center column) has better performance than the other, and the inter-module crosstalk is low, which is sometimes the preferred arrangement in network applications. Such an arrangement requires a more complicated arrangement of wave plate array in the polarization diversity element and is where the LC-based WP array becomes extremely useful. The ports near the COM ports have the best insertion loss (IL) and thus can be used for the express ports.

Figure 5A:
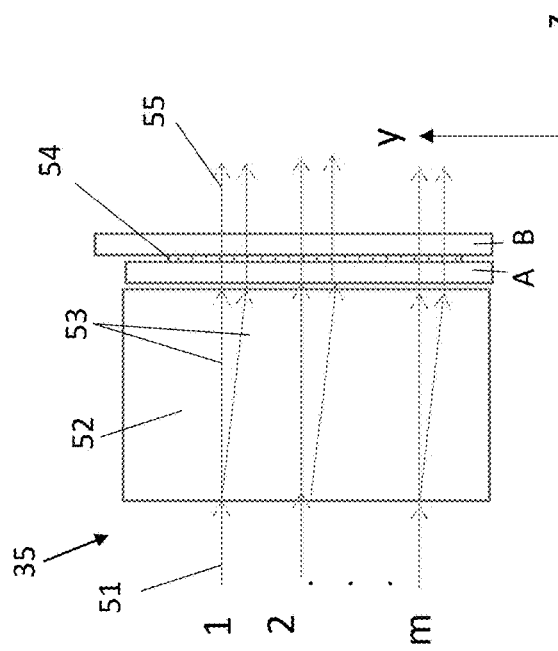
FIGS. 5A-5C illustrate different implementations of a liquid crystal wave plate array for polarization diversity.
Figure 5B:
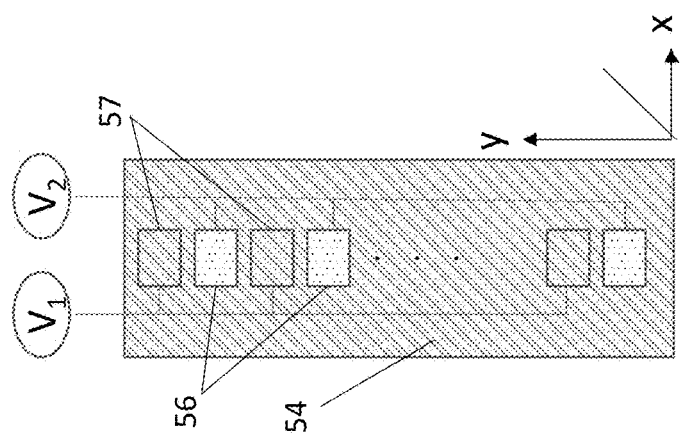
Figure 5C:
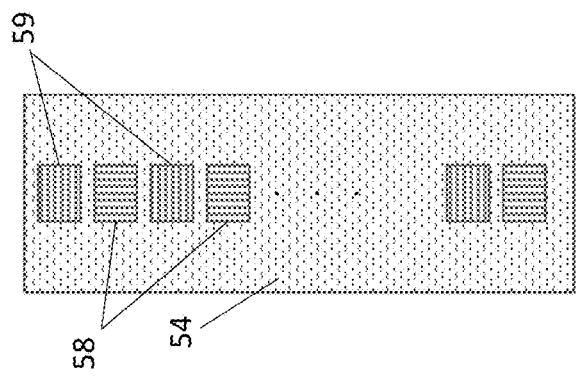

FIG. 5A-5C illustrate the polarization diversity element. It should be noted that this element can also be used in a regular WSS as well as other optical devices, such as an optical cross connector, or an optical multicast switch. It includes a birefringence crystal 52, which separates the un-polarized light beam 51 from the m input ports into two polarized light beams 53. Each enters a different pixel of the liquid crystal (LC) based wave plate (WP) array 54.

As shown in FIG. 5B, one embodiment of the LC WP array 54 is to use an electrically controlled birefringence (ECB) LC cell, which has an alignment layer rubbed either along the direction 45° from the X-axis and m pairs of pixels. When all even pixels 56 are applied with a high voltage $V_1$, it makes the LC act like a wave plate with zero phase difference between ordinary and extraordinary axes, thus the beam passing through it does not rotate the polarization. On the other hand all the odd pixels 57 are applied with a low voltage $V_2$, which makes the LC act like a wave plate with a $\lambda/2$ phase difference between birefringent axis that rotates the input beam's polarization by 90° (from s polarized to p-polarized or vice versa). Thus, the output beams 55 are polarized in a single polarization state. The advantage of using a LC based WP array is to allow light beams from densely packed ports with various arrangements to achieve a single polarization. The pixels arrangement on the LC WP 54 is not limited to a single vertical array. It can be multiple arrays with different pitches to match the port arrangement.

FIG. 5C illustrates another embodiment for the LC WP array with a UV-induced micro-structured alignment layer along the X-axis and the Y-axis for each pair of pixels. Pixels 58 on glass plate B have a 90 degree alignment layer to perform 90 degree rotation of the input light. Pixels 59 on glass plate B have a 0 degree alignment layer to perform no rotation of the input light. In this configuration, twist neumatic (TN) type of LC is used. For the pixels that the alignment layers on two plates are perpendicular, the polarization of the beam will rotate 90 degrees following the TN molecules without any externally applied voltage. For the other set of pixels, the LC alignment is parallel on both plates, thus the input beam polarization is either parallel or perpendicular to the molecules and does not rotate. The advantage of using the configuration in FIG. 5C is that it is a passive element without external control.

FIGS. 6A-6D show a prism element that is used to rotate port orientation from horizontal to vertical. The right angle prism 61 has a total internal reflection (TIR) surface 62, a beam entrance surface 63 and a beam exit surface 64. The input beam 65 is horizontally aligned. The output beam 66 is vertically aligned after reflection by the total TIR surface.

The prism axis is perpendicular to the TIR surface. In the optical system with the beam propagating in the Z-axis direction, the prism axis is placed in the X-Y plane with a tilt angle of 45° from the X-axis or the Y-axis, as shown in FIGS. 6B-6D. The horizontally aligned light beams enter the entrance surface 63 and are refracted to the TIR surface 62 and reflected by the TIR surface and exit out from the exit surface 64 in an orthogonal or vertical alignment. In practice, the prism apex shall be cut along the cut line 67 at 45° from the prism axis so the two cut surfaces will be in X and Y planes respectively allowing for easy alignment and mounting of the element. The rotation of the beam orientation allows the optical device to have limited space in one direction. Note that the rotation can be at any angle depending on the tilt angle of the prism axis. Element 68 shows the cut surface for alignment and mounting.

Figure 7B:
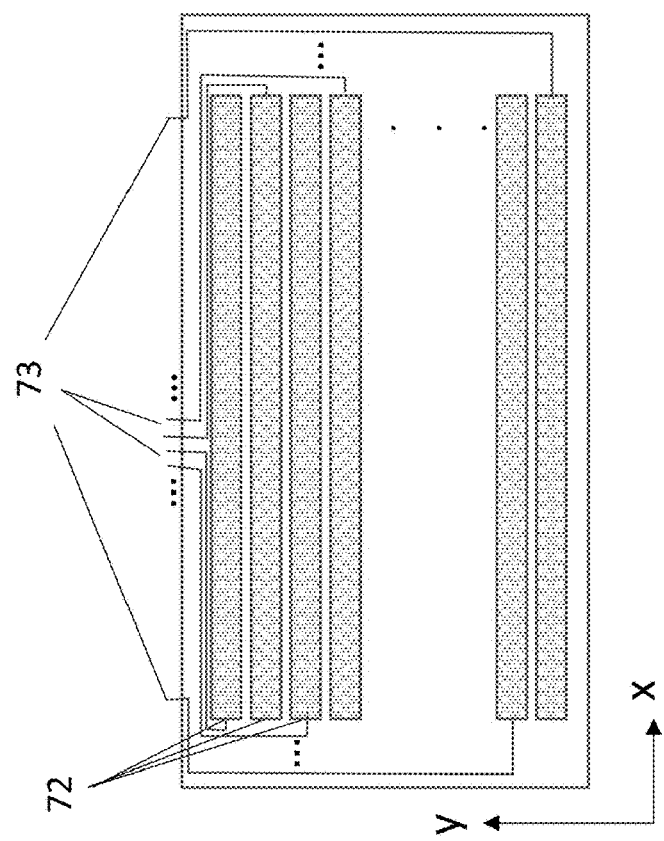
FIGS. 7A-7B illustrate a Thermal Compensation Liquid-Crystal Lens (TCLL) to compensate the thermal lensing effect from the switch in accordance with an embodiment of the invention.
Figure 7A:
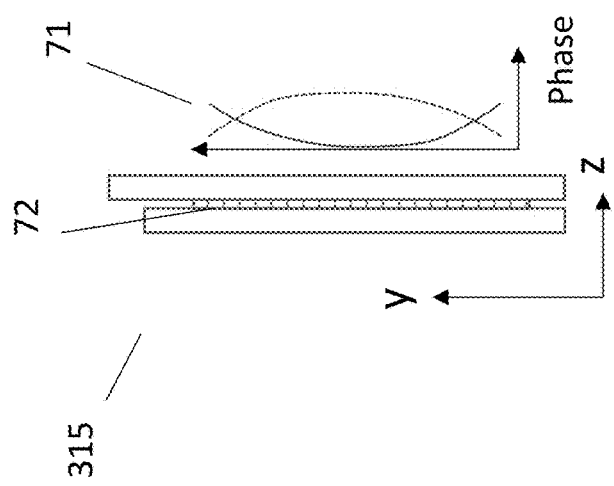

FIGS. 7A-7B show the design and working principle of a TCLL 37 to compensate for the phase change introduced in the system in response to temperature variations. It includes an ECB LC cell with pixels along the direction where phase need to be corrected. In the case of a shared switch WSS, the thermal lensing effect (i.e., the phase change 71) is along the Y-axis, thus the array of pixels of TCLL 72 are along the Y direction, as shown in FIG. 7B in the front view. The array of pixels are voltage controlled with metallic (e.g., gold) runners 73, which are separated at two sides for odd and even pixels. This can provide different phases along different Y locations forming either a linear phase correction or a quadratic phase correction or a combination of the two. The linear phase correction is usually used to compensate the beam steering angle introduced by the minor bent of an optical bench due to thermal effect and the quadratic phase is used to compensate the lensing effect introduced by the LC switch. The optimized linear coefficient and quadratic coefficient is through a calibration program where the shared switch WSS is placed in a thermal chamber and the optimized set of coefficients is found by optimizing the output power of the device. If the array of pixels of a TCLL is horizontally aligned (i.e., along the X-axis), it will introduce extra phase change along the X-axis. For the shared switch WSS, the TCLL can be placed after the polarization diversity element and before the grating to tune the wavelength drift. The TCLL can be used not only in the shared switch WSS described, but also in any WSS or cross connect optical devices where fine alignment is needed or compensation of beam drifting or beam power change is needed when temperature changes.

An alternative method to reduce the thermal lensing effect is to keep the LC switch at a constant temperature or a narrow temperature range. One method for achieving the constant temperature is to add an external heater elements or a thermal electrical temperature controller (also known as a Thermal Electrical Cooler or TEC) element in the device or module. However, the external elements are costly, bulky, and often require extra mounting to support them. The LC heating element in one embodiment is added directly to the switch without needing extra space and thus leads to minimal cost increase.

FIGS. 8A-8B show one embodiment of such heating element. On a LC plate 81, there usually is a gasket 82 that seals the LC material in between two glass plates, which is slightly larger than the active area 82, leaving some margin to avoid the edge effect introduced near the gasket. A photolithographically patterned metallic (e.g., gold) runner 84 is placed outside the gasket which is connected to a gold pad 85 for bonding wires that connect the metallic runner to a power supply. This metallic structure generates heat to the glass plate when a current is applied. It can be a straight line or other geometric pattern with the width and thickness defined depending on the heating power requirement and the space. Temperature control is accomplished with a temperature sensing element mounted on the LC switch to keep the LC switch in a narrow temperature range.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A multiple wavelength selective switch, comprising:
   a multiport unit comprising a plurality of optical signal ports including a set of N input ports, each input port for receiving a separate optical channel of one or more wavelengths, a set of N output ports, each output port for transmitting a separate optical channel of one or more wavelengths, the sets of N input ports and N output ports paired such that each pair utilizes a defined optical channel, the plurality of optical signal ports further including a common input port for supporting optical communications destined for one or more of the set of N output ports and a common output port for supporting optical communications from one or more of the set of N input ports;
   an optics assembly to receive input optical signals from the multiport unit and to transmit output optical signals to the multiport unit; and
   a switch assembly disposed beyond the optics assembly, the switch assembly comprising a single switching mechanism reconfigurably oriented to direct a selected input optical signal from a selected input port I of the set of N input ports to the common output port and simultaneously direct a portion of the received input signal along the common input port into a selected output port I of the set of output ports that is paired with the $I^{th}$ input port wherein the $I^{th}$ input port and the $I^{th}$ output port utilize the same wavelength channel.

2. The multiple wavelength selective switch of claim 1 wherein the optics assembly includes a beam combiner to combine a set of optical signals from the set of N input ports with a common input optical signal from the common input port, wherein the set of input optical signals and the common input optical signal are received from ports with different locations and directions.

3. The multiple wavelength selective switch of claim 1 wherein the optics assembly includes a polarization diversity element.

4. The multiple wavelength selective switch of claim 3 wherein the polarization diversity element includes a polarization beam splitter.

5. The multiple wavelength selective switch of claim 3 wherein the polarization diversity element includes a polarization rotator.

6. The multiple wavelength selective switch of claim 5 wherein the polarization rotator is a liquid crystal wave plate array.

7. The multiple wavelength selective switch of claim 6 wherein the liquid crystal wave plate array includes:
   an electrically controllable birefringence liquid crystal pixel array with a first set of pixels with a first applied voltage that causes a first subset of polarized beams to experience a ninety degree polarization rotation, and a second set of pixels with a second applied voltage that causes a second subset of polarized beams to experience no polarization rotation.

8. The multiple wavelength selective switch of claim 6 wherein the liquid crystal wave plate array includes:
   a twisted nematic liquid crystal pixel array with a first set of pixels with a permanent ultraviolet induced micro-structured alignment layer that causes a first subset of polarized beams to experience a ninety degree polarization rotation, and a second set of pixels with another permanent ultraviolet induced micro-structured alignment layer that causes a second subset of polarized beams to experience no polarization rotation.

9. The multiple wavelength selective switch of claim 3 wherein the polarization diversity element includes a variable optical attenuator.

10. The multiple wavelength selective switch of claim 1 wherein the optics assembly includes beam expansion prisms.

11. The multiple wavelength selective switch of claim 1 wherein the optics assembly includes a dispersion prism.

12. The multiple wavelength selective switch of claim 1 wherein the optics assembly includes a dispersion grating.

13. The multiple wavelength selective switch of claim 1 wherein the optics assembly includes a focusing element.

14. The multiple wavelength selective switch of claim 1 wherein the optics assembly includes a beam tilt correction prism.

15. The multiple wavelength selective switch of claim 1 wherein the switch assembly is a liquid crystal switch assembly.

16. The multiple wavelength selective switch of claim 15 wherein the liquid crystal switch assembly includes an embedded heating element.

17. The multiple wavelength selective switch of claim 1 wherein the switch assembly includes a thermal compensation liquid-crystal lens.

* * * * *